United States Patent [19]
Golner et al.

[11] Patent Number: 5,902,381
[45] Date of Patent: May 11, 1999

[54] DEHYDRATING BREATHER APPARATUS

[75] Inventors: Thomas M. Golner, Pewaukee; Shirish P. Mehta, Waukesha, both of Wis.

[73] Assignee: General Signal Corporation, Muskegon, Mich.

[21] Appl. No.: 08/865,615

[22] Filed: May 30, 1997

[51] Int. Cl.$^6$ .................................................. B01D 53/04
[52] U.S. Cl. ............................. 96/146; 96/108; 96/115; 96/147; 96/151
[58] Field of Search ............................ 96/146, 108, 118, 96/115, 151, 147

[56] References Cited

U.S. PATENT DOCUMENTS

| | | | |
|---|---|---|---|
| 3,224,168 | 12/1965 | Gregory | 96/146 |
| 3,261,145 | 7/1966 | Paulson et al. | 96/146 |
| 3,335,550 | 8/1967 | Stern | 96/146 |
| 3,559,382 | 2/1971 | Jaggard et al. | |
| 4,437,082 | 3/1984 | Walsh et al. | |
| 4,544,385 | 10/1985 | Tanaka | 96/146 |
| 4,582,516 | 4/1986 | Radi | 96/146 |
| 4,999,034 | 3/1991 | Mager et al. | |

OTHER PUBLICATIONS

S.P. Mehta, T.M. Golner, "Transformer Design Considerations for Reduced Maintenance Cost," paper presented at Waukesha Electric Systems Client Group Meeting 1996, at New Orleans, Louisiana, Feb. 2, 1996.

*Primary Examiner*—Jay H. Woo
*Assistant Examiner*—Robert Hopkins
*Attorney, Agent, or Firm*—Ohlandt, Greeley, Ruggiero & Perle

[57] ABSTRACT

A maintenance free dehydrating breather apparatus for equipment such as oil cooled transformers and the like includes a cap and vessel enclosing a container for desiccant. A heater is mounted within the container in contact with the desiccant. The apparatus is connected through the cap to the equipment being supplied with dehydrated air. When the equipment requires dehydrated air, it draws air in through a vent valve in the vessel and thence through walls of the container and the desiccant. When the equipment expels air, the air is passed out through the vent valve, which otherwise normally seals off the interior of the vessel from the moisture in outside air. At selected intervals, for a selected period of time, a heater within the container is supplied with electrical power to heat the desiccant to drive off the moisture therefrom, which condenses on the walls of the vessel and flows to the bottom of the vessel where it is discharged through the vent valve.

18 Claims, 4 Drawing Sheets

DEHYDRATING BREATHER APPARATUS

FIELD OF THE INVENTION

This invention pertains generally to the fields of electrical power equipment such as transformers and to dehydrators for removing moisture from air, and particularly to dehydrating breathers for equipment such as electrical transformers.

BACKGROUND OF THE INVENTION

In some types of equipment, it is necessary or desirable to remove moisture from air or other gas being drawn into the equipment. Examples are large electrical transformers and other high power electrical equipment, such as load tap changers, circuit breakers and conservators, which are immersed in oil to provide electrical insulation and cooling Because the oil expands and contracts with temperature changes, such equipment is typically provided with a head space above the oil or an oil reservoir which is vented to the atmosphere. To inhibit drawing in moisture from atmospheric air which could contaminate the oil, the air drawn in through the vent is passed through a desiccant before entering the tank or reservoir. A typical desiccant in common use is silica gel held in a container through which the air drawn in (and expelled out) passes.

To minimize contact of moisture-laden air with the desiccant when air is not being drawn in, a seal or valve of some sort is usually provided between the desiccant container and the vent entrance. Typical valves include a simple oil cup and mechanical structures that respond to air pressure differentials between the exterior and interior of the container.

Some dehydrating breathers are prone to the phenomena of "channeling" in which air flows primarily over only a part of the desiccant, reducing the effectiveness of the desiccant. Proper design of the breather is necessary to reduce or eliminate channeling.

Over time, the desiccant in such breathers inevitably becomes saturated with water and no longer is capable of adequately drying the incoming air. Consequently, the desiccant material must be periodically replaced or reactivated. Although the replacement of the desiccant is neither costly nor time consuming, this maintenance task is often overlooked. As a consequence, very commonly the gas space over the oil will contain excessive moisture.

SUMMARY OF THE INVENTION

In accordance with the present invention, a dehydrating breather apparatus periodically regenerates the desiccant so that incoming air drawn to the transformer or other equipment is maintained substantially free of moisture. The regeneration of the desiccant takes place automatically, allowing substantially maintenance free operation without attention from an attendant. The cost of time and materials for periodically replacing the desiccant charge is eliminated, and regeneration takes place using limited amounts of electrical power for heating the desiccant to drive off moisture. The dehydrating breather apparatus of the invention limits contact between moisture laden outside air and the desiccant during stable periods when the associated equipment is neither drawing air in nor expelling air out, thereby maximizing the dehydrating ability of the desiccant. The dehydrating breather apparatus in accordance with the present invention is a rugged, self-contained, compact structure that can be readily connected to installed equipment to replace existing breathers.

The dehydrating breather apparatus includes a container for holding desiccant and permitting incoming air to pass therein through the desiccant, and a heater within the container that is in contact with the desiccant and which can be periodically heated up by supplying electrical power thereto to drive off the moisture from the desiccant. A vessel mounts around the desiccant container and has an interior wall which is spaced from the container and out of contact with it, and which slopes down toward a bottom port. A cap is engaged with the vessel to close the desiccant container off from the ambient atmosphere. An orifice extends through the cap to the interior of the container, and the orifice can be connected to a line or hose leading to the equipment to be vented, such as the volume above the oil in a transformer tank or reservoir or above the oil in a line tap changer. The vessel has a vent to allow air to be drawn in or expelled and a vent valve is preferably mounted in the vent in the vessel wall, preferably at the bottom port, to admit air into the vessel when the equipment is drawing air from the orifice, but otherwise to substantially close off the interior of the vessel from outside atmosphere. The vent valve may also permit air being expelled from the equipment to pass out of the vessel into the outside atmosphere.

The temperature of the vessel wall material, such as plastic, is substantially at the temperature of the outside ambient air. Electrical heating elements in the heater are connected by electrical supply wires to a timer which periodically supplies power to the heating elements so that the heater heats the desiccant to a temperature above that required to drive off moisture from the desiccant. During the heating of the desiccant, the moisture laden air within the vessel is at a higher temperature than the vessel wall, resulting in condensation of water on the interior surface of the vessel. This condensed moisture flows down the interior walls of the vessel and is discharged through the port at the bottom of the vessel. Preferably, the vent valve is also mounted at the bottom port of the vessel and serves additionally to permit the discharge of condensed water through the vent valve to the exterior of the breather apparatus while nonetheless inhibiting the entrance of ambient air into the vessel.

The container is preferably formed with a cylindrical mesh screen and a closed bottom that together contain the heater and the desiccant. The mesh screen of the container freely allows air to pass in and out while holding the desiccant material, which is typically in particulate form, in place. The heater within the container preferably is formed with a finned heat exchanger composed, for example, of blocks of extruded aluminum, with multiple channels formed between the fins of the heat exchanger which hold desiccant therein. The fins of the heat exchanger also provide large contact areas between the fins and the desiccant for efficient heat transfer to the desiccant. Electrical resistance heating elements are mounted to the heat exchanger blocks; these are preferably of the positive temperature coefficient type so that the temperature of the heating elements, and the blocks, will stabilize at a desired temperature without requiring the use of a separate temperature sensor and temperature control circuit. The fins further define channels between them, holding the desiccant, which function as flow channels for the incoming air to distribute the air flow and maximize the path of the air through the desiccant and thereby enhance the efficiency of the moisture removal operation. Preferably, the heat exchanger has a central channel running the length of the heat exchanger blocks which is in communication with the orifice in the cap, with air entering the central channel through holes extending laterally through the finned blocks to positions at the bottom of the channels between the fins, thereby further insuring that the air drawn in passes through the desiccant through a long passage to maximize the removal of moisture from the incoming air.

The vent valve in the vessel may comprise a ball valve which lightly seals the vent when the pressure inside and outside the vessel is the same to minimize migration of moisture laden ambient air into the vessel. The ball of the ball valve readily moves to allow air to pass through when a pressure differential exists between the inside and outside of the vessel. Further, the ball of the ball valve preferably is lighter than water and will permit condensed water to pass through the valve to the exterior of the vessel. The vent preferably is closed with a porous filter, for example formed of sintered bronze, which filters particulates from the incoming air and which further allows the condensed water to be wicked therethrough and discharged from the vessel without requiring attention from personnel to drain the condensed water from the vessel.

Further objects, features and advantages of the invention will be apparent from the following detailed description when taken in conjunction with the accompanying drawings.

DETAILED DESCRIPTION OF THE INVENTION

Figure 1:
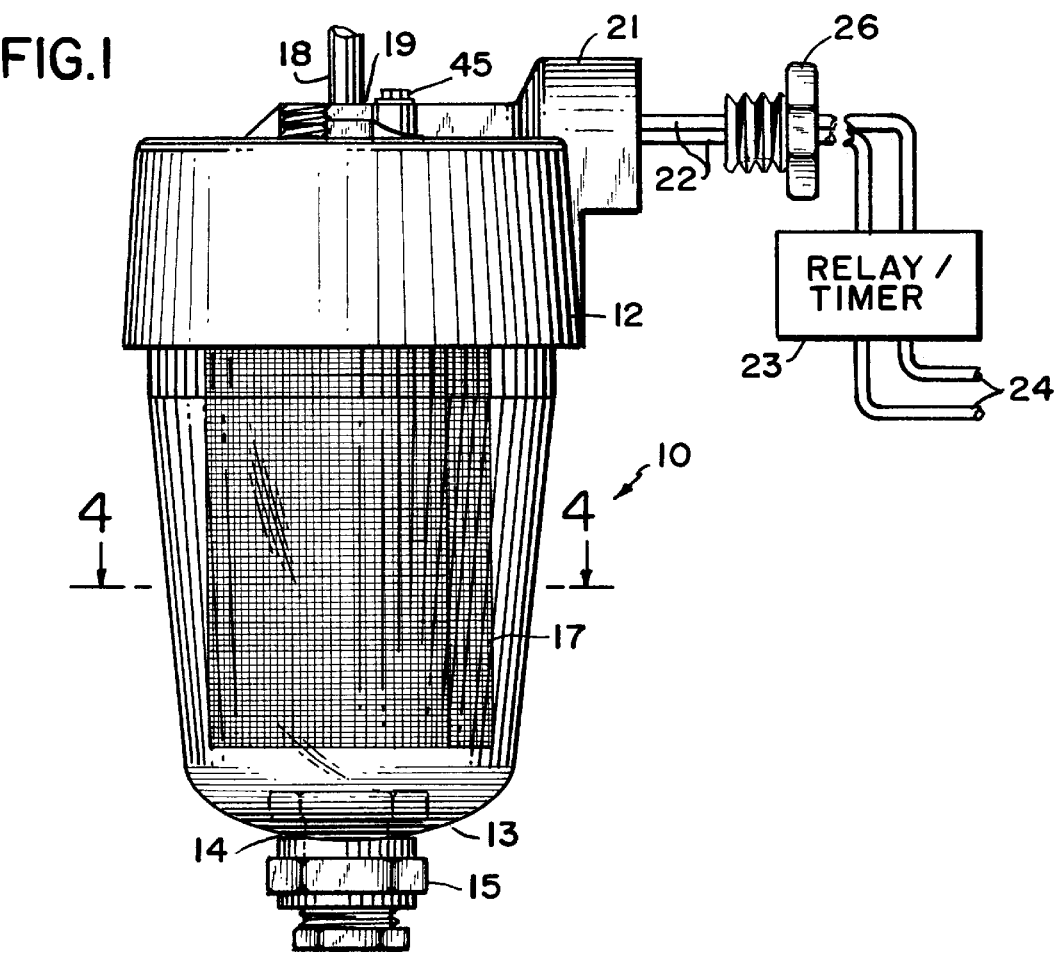
FIG. 1 is a side elevation view of the dehydrating breather apparatus of the present invention.
Figure 3:
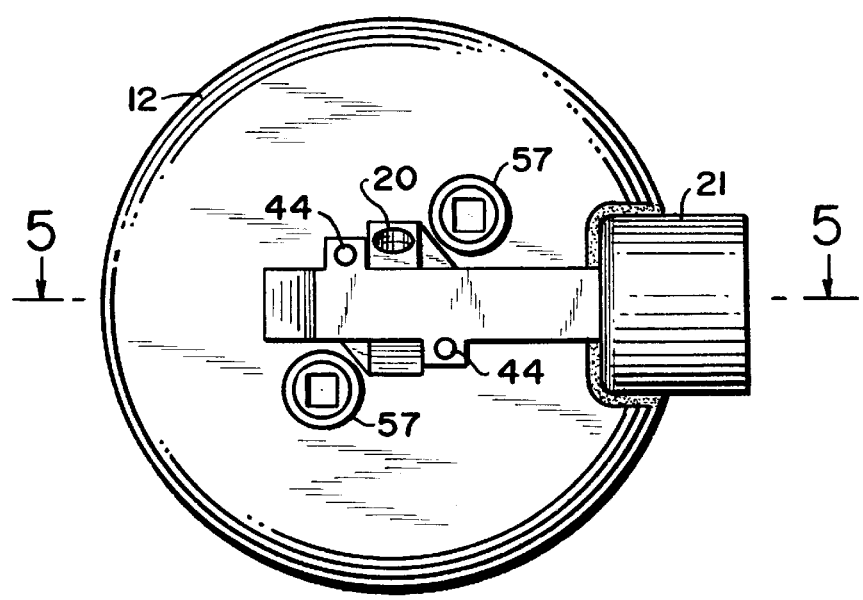
FIG. 3 is a top view of the breather apparatus of FIG. 1.

With reference to the drawings, a dehydrating breather apparatus in accordance with the present invention is shown generally at 10 in FIG. 1. The apparatus 10 includes a thin walled vessel 11, which may be formed of glass or a transparent plastic such as polycarbonate, and a cap 12 (e.g., cast aluminum) which is engaged with the top of the vessel 11. The vessel 11, as shown, preferably tapers down to a bottom portion 13 and has a bottom port and vent 14 at which a vent valve 15 is mounted. A container 17 for desiccant is mounted within the interior of the vessel 11 (and is visible where the vessel 11 is formed of a transparent material). A hose 18 extends from the apparatus 10 to the transformer, load tap changer, or other equipment to be vented to transfer air to or from the equipment. The hose 18 is connected to the cap 12 by a fitting 19 which is mounted to an orifice 20 (shown in FIG. 3) extending through the cap 12 to the interior of the container. Extending from an integral bracket 21 formed on the top of the cap 12 are electrical supply wires 22 which are connected to a relay/timer 23 that is supplied with electrical power through power lines 24. A coupling 26 is adapted to thread into an interior bore of the bracket 21 to mount the apparatus 10, for example, to the wall panel of an electrical control box (not shown). The relay/timer 23 is programmed to provide power from the power lines 24 to the supply lines 22 at predetermined (and preferably adjustable) intervals for a predetermined (and preferably adjustable) period of time. The relay/timer 23 may be any convenient and desired type of timer, including commercially available timer units (e.g., 120 VAC, 10 AMP relay/timer available from Airotronics, Casanovia, N.Y.). The relay/timer 23 may be factory set to have appropriate on-times and intervals. A typical suitable duty cycle is three hours on, supplying power through the timer to the rest of the apparatus, and two weeks off.

Figure 2:
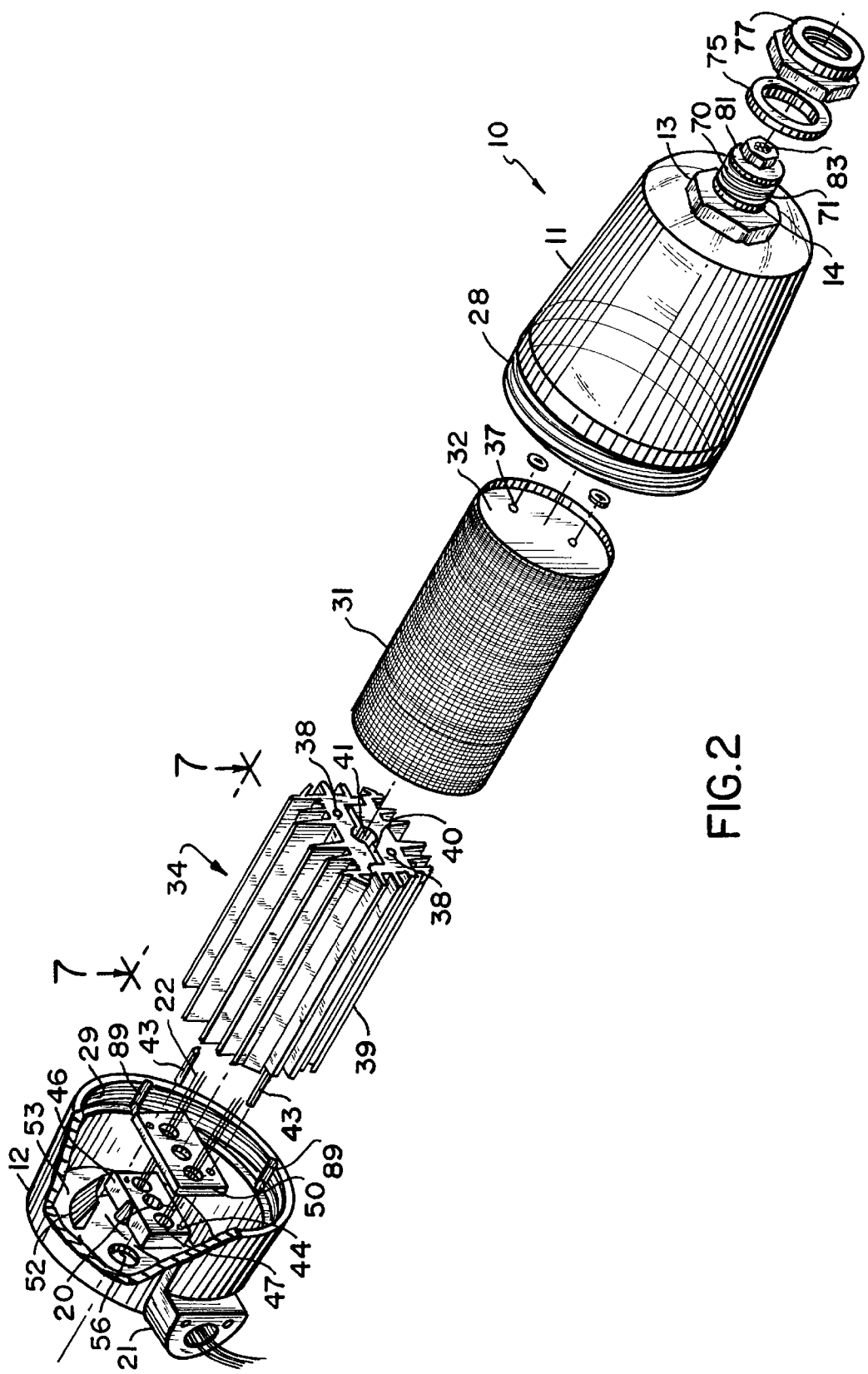
FIG. 2 is an exploded view of the apparatus of FIG. 1 illustrating the internal parts of the apparatus and their manner of assembly.

An exploded view of the apparatus 10 is shown in FIG. 2, illustrating the internal parts of the apparatus, their relative position, and the manner of assembly. As illustrated in FIG. 2, the vessel 11 is formed as an elongated bowl with interior surfaces generally converging toward the bottom end 13 of the vessel where the outlet port 14 is closed by the vent valve 15. At the top of the vessel are formed threads 28 by which the vessel 11 may be engaged with corresponding threads 29 in the interior surface of the cap 12, allowing the vessel to be screwed tightly into the cap 12 to form a sealed volume defined between the vessel 11 and the cap 12. The container 17 preferably has a cylindrical wall 31 of a mesh screen, such as stainless steel or aluminum mesh, with a circular bottom panel 32 (e.g., stainless steel or aluminum) engaged to the cylindrical mesh screen 31. A heater 34 fits within the container 17, and the two are connected by screws 36 which pass through openings 37 in the bottom panel 32 and threadingly engage with threaded holes 38 formed in the bottom of a finned heat exchanger 39 in the heater 34. The finned heat exchanger 39 may be composed of two separate blocks, each formed for example, as an aluminum extrusion, which are joined together at a joint 40 and which have semi-cylindrical indentations which together define a central channel 41 running through the middle of the heat exchanger 39.

Figure 5:
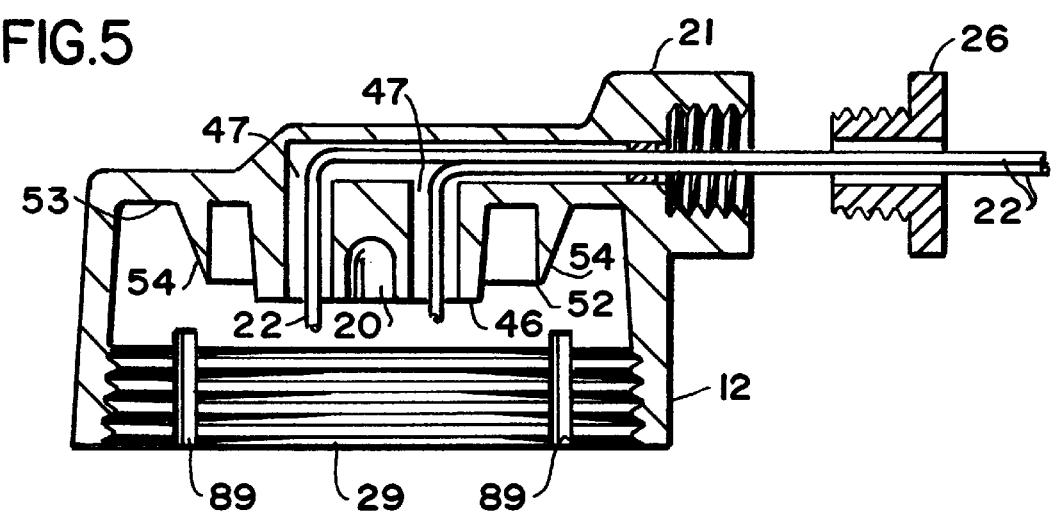
FIG. 5 is a cross-sectional view of the cap portion of the apparatus of FIG. 1, taken generally along the lines 5—5 of FIG. 3.

The finned heat exchanger 39 has upwardly extending threaded studs 43 which fit through holes 44 in the cap 12, by which the heater 34 may be secured to the cap by nuts 45 (as shown in FIG. 1) that are threaded on to the tops of the studs 43 that extend above the top of the cap 12. As shown in FIG. 2, the cap 12 has a base section 46 that extends downwardly from the adjacent interior surface of the cap and in which are formed holes 47, through which the electrical wires 22 pass, and the orifice 20 which is in communication with the tube 18. A rubber gasket 50 has openings formed in it to match with the holes 44, 47 and 20, and when the heater 34 is tightly engaged to the cap 12, the gasket 50 provides a seal around the orifice 20 so that the orifice 20 is in communication only with the interior of the central channel 41 within the heater. A ring flange 52 extends downwardly from the inner surface 53 of the cap and has an inwardly tapered outer surface 54, as best shown in the cross-sectional view of FIG. 5, which engages against the top edge of the cylindrical mesh screen 31 to provide a tight fit between the top edge of the mesh screen and the side surface 54.

Also shown in FIG. 2 is one of two openings 56 formed in the cap 12 by which desiccant may be introduced into the interior of the container 17. After the desiccant, which usually is in the form of a particulate, is introduced through the openings 56, the openings are closed by plugs 57, best shown in FIG. 3, which thread into the holes 56.

Figure 4:
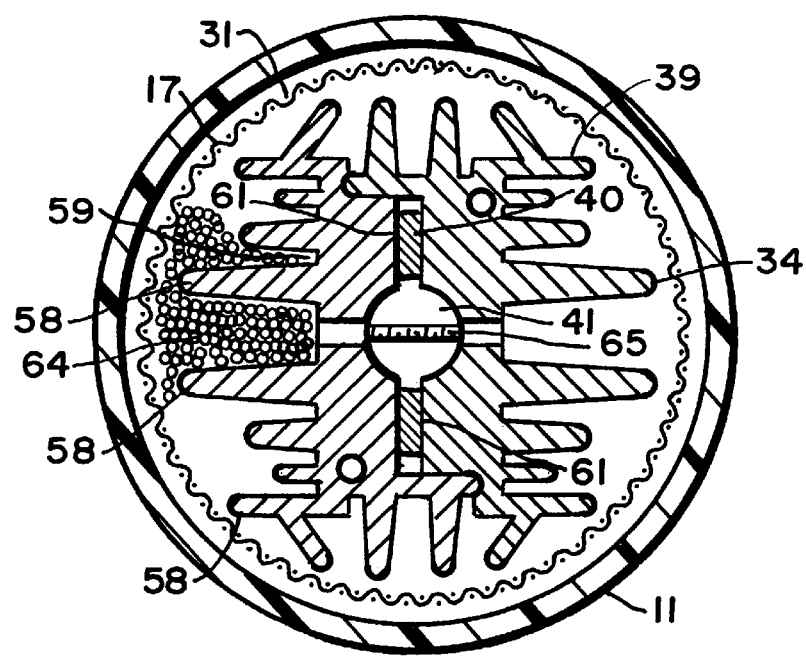
FIG. 4 is a cross-sectional view taken generally along the lines 4—4 of FIG. 1.
Figure 7:
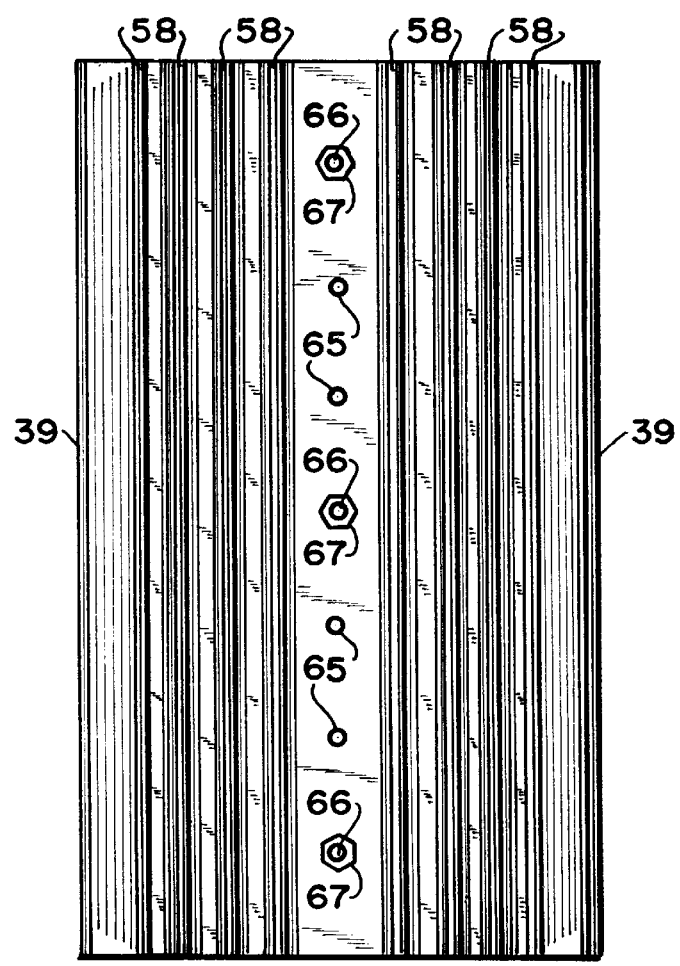
FIG. 7 is an elevational view of the finned heat exchanger of the breather apparatus.

As best shown in the cross-sectional view of FIG. 4, the finned heat exchanger 39 may be formed in two blocks, each of which have multiple thin fins 58 which extend outwardly from a central core 59. Between the central cores 59 of each of the two heat exchanger blocks are mounted electrical heating elements 61 such that the elements 61 are in close contact with the cores 59 of each of the heat exchanger blocks. The electrical heating elements 61 are supplied with electrical power by the supply lines 22. The heating elements 61 are preferably positive temperature coefficient (PTC) high power, flat heating elements that have high power density and that essentially self-regulate to a desired temperature. Suitable commercial heating elements are available from various sources including David & Baader GmbH. As illustrated in FIG. 4, the central channel 41 is formed by mating semi-cylindrical indentations in the bases 59 of the two blocks of the heat exchanger 39. As also illustrated in FIG. 4, particulate desiccant (e.g., silica gel) 64 fills the spaces in the channels between the fins 58 and between the cylindrical mesh wall 31 of the container and the heat exchanger. The fins 58 provide large surface areas for contact with the desiccant 64 so that when the heat exchanger is heated by the elements 61, the desiccant 64 will be rapidly and relatively uniformly heated by the heat exchanger to drive off moisture. Further, the channels between the fins 58 serve, during normal operation of the breather, to channel incoming air drawn through the cylindrical mesh wall 31 longitudinally through the channels, and thus through a relatively long path through the desiccant 64, before the incoming air is drawn into the central channel 41, primarily through lateral openings 65 (shown in cross-section in FIG. 4 and in the elevation view of the heat exchanger in FIG. 7). As illustrated in FIG. 7, the two finned blocks which form the finned heat exchanger 39 are joined together by threaded bolts 66 and corresponding nuts 67.

Figure 6:
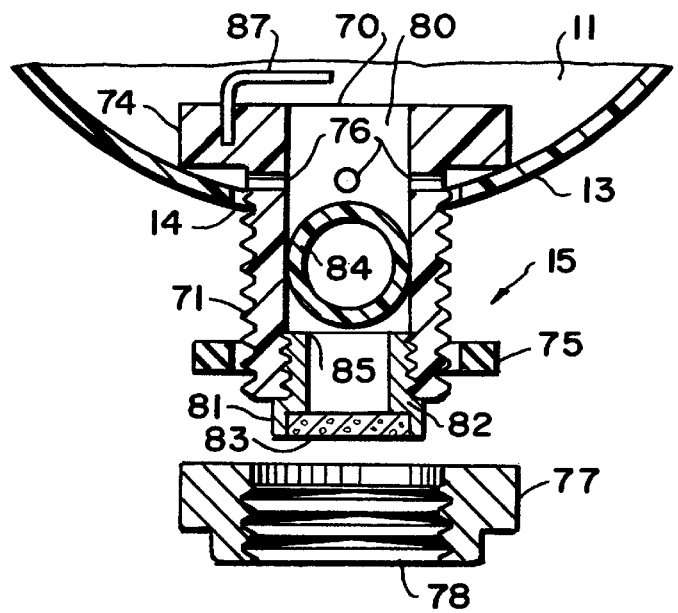
FIG. 6 is a more detailed cross-sectional view of the bottom portion of the breather apparatus, illustrating the vent valve and particulate filter.

A more detailed cross-sectional view of the vent valve 15 mounted at the bottom of the vessel 11 is shown in FIG. 6. The vent valve 15 includes an inner fitting 70 which has a threaded core 71 that passes through the bottom port opening 14 at the bottom of the vessel 11 and a wider flange 74. A rubber gasket 75 provides a seal between the core 71 and the outside surface of the vessel 11 at the bottom of the vessel. A collar 77, with an internal threaded bore 78, threads over the core 71, and into the gasket 75, and thus secures the vent valve 15 tightly in place on the vessel 11. The fitting and collar 77 may both be formed of plastic, e.g., polyvinyl chloride. The fitting 70 has an inner bore 80 which is closed at the bottom end by a plug 81 that is threaded into the bore 80 by engagement with an inwardly extending lip 82 formed at the bottom of the inner bore 80. The plug 81 has a porous filter insert 83, formed, for example, of sintered bronze, which serves to filter particulates from the air drawn into the interior of the vessel through the filter 83. In addition, the filter 83 also allows water that has condensed on the inner walls of the vessel 11 and that has flowed into the bore 80 through holes 76 in the core 71 to be wicked through the porous filter 83 and be discharged by gravity. A floating ball 84 fits within the bore 80 and lightly engages the top rim 85 of the plug 81 to provide a light seal when the ball 84 is resting against the rim 85, as shown in FIG. 6. When air is to be drawn into the interior of the vessel 11 through the filter 83, the ball 84 is pulled away from the rim 85 by a differential in air pressure between the outside and inside of the vessel to allow the admission of air. Similarly, when the air pressure within the vessel 11 exceeds the air pressure outside the vessel—for example, when the expansion of oil forces air into the interior of the vessel 11—the ball 84 is sufficiently light to be moved aside so that air can be expelled through the filter 83. The ball 84 blocks the admission of moisture laden air into the vessel when there is no pressure differential. A small rod 87 is attached to the fitting 70 and can be swung out over the bore 80 as shown, to prevent the ball 84 from falling out or being blown out under usual circumstances. Grooves or indentations 89 (best shown in FIG. 5) may also be formed in the threads 29 in the cap 12 to permit some additional flow of air under pressure in or out of the vessel through these grooves.

The dehydrating breather apparatus 10 is installed by mounting the apparatus to an electrical cabinet or suitable wall using the coupling 26 (or other desired mounting device), and by mounting the relay timer 23 within the electrical cabinet and connecting the electrical supply lines 24 to provide power to the timer 23. The hose 18 is extended up to a fitting that communicates with the interior of the particular equipment being vented, such as the tank of a transformer, control cabinet, conservator oil preservation system, pneumatic and hydraulic oil reservoirs, load tap changers, or any other equipment where a desiccator breather is used. During installation of the breather apparatus, the installer can fill the apparatus with particulate desiccant by removing the plugs 57 and poring the particulate desiccant in through the holes 56. Preferably, the desiccant covers the top of the finned heat exchanger 39 to a depth of 3 to 6 mm. Proper distribution of the desiccant can easily be obtained by tapping the apparatus to fully distribute the desiccant through all of the channels between the fins of the heat exchanger 39. The vessel 11 can be unscrewed from the cap 12 to remove any desiccant particles which have passed through the mesh screen 31 of the container 17, and the vessel can be reinstalled simply by screwing it back into the cap. The power is then turned on to the timer 23 and the apparatus is set for automatic operation. Typical duty cycles as controlled by the relay/timer 23 are two hours on every two weeks, or, in very humid climates, three hours on every week. The positive temperature coefficient heaters 61, when supplied with electrical power, will stabilize at a temperature predetermined for such heating elements. A stable operating temperature for the heating elements 61, transmitted through the finned heat exchanger 39 to the desiccant, of 130° C. has been found satisfactory for a silica gel desiccant, although higher and lower temperatures may be utilized where appropriate such as where other desiccants are used. After the initial charging of the breather apparatus with desiccant, no further attention should generally be required by an attendant. Over very long periods of times degeneration of the desiccant may require recharging with new desiccant, which can easily be accomplished by unscrewing the plugs 57 and supplying fresh desiccant through the holes 56. Also, if an attendant notices that excessive moisture has accumulated within the vessel 11, which can be determined where a preferred transparent material such as polycarbonate plastic is used for the walls of the vessel 11, the attendant can simply unscrew the vessel 11 from the cap 12 and empty out the moisture and wipe out the interior of the vessel 11 before reinstalling it.

It is understood that the invention is not confined to the particular construction and arrangement of parts herein illustrated and described, but embraces all such modified forms thereof as come within the scope of the following claims.

What is claimed is:

1. Dehydrating breather apparatus for removing moisture from air being drawn through said apparatus to produce dehydrated air, said a apparatus comprising:

(a) a container for a desiccant that permits said air to flow through desiccant in the container, said container including a screen and a bottom panel engaged to said screen, said dessicant adsorbing said moisture;

(b) a heater within the container where it can be in contact with said desiccant, the heater heating the desiccant to drive off said adsorbed moisture when the heater is supplied with electrical power;

(c) a vessel around the desiccant container, said vessel having a thin wall with an interior surface spaced from the container, said wall being substantially at the temperature of the outside ambient air and said driven off moisture being at a temperature higher than the temperature of said wall, whereby said moisture condenses on said interior surface;

(d) a cap engaged with the vessel to close off the desiccant container from the outside ambient atmosphere;

(e) an orifice extending through the cap to the interior of the container through which said dehydrated air may be drawn that passes from the interior of the vessel through the desiccant within the container; and (f) a vent in the vessel to admit air into and release air from the interior of the vessel, and a discharge port in the vessel through which said moisture condensed on said interior surface of said wall of the vessel and accumulated at the bottom of the vessel can be discharged.

2. The dehydrating breather apparatus of claim 1 wherein the vent is located at the bottom of the vessel and also serves as the port for discharge of condensed water accumulated at the bottom of the vessel.

3. The dehydrating breather apparatus of claim 2 including a plug mounted in the vent having a filter of porous material that filters the air passed through it to filter out particulates and that wicks moisture from the interior of the vessel through the plug to the exterior of the vessel.

4. The dehydrating breather apparatus of claim 3 including a vent valve in the vent, wherein the vent valve includes a ball engaged with the rim of the plug, the ball being disengaged by a differential in pressure between the outside and inside of the vessel to admit air into or discharge air from the interior of the vessel when there is a pressure differential and otherwise blocking the passage of moisture laden air into the interior of the vessel when there is no pressure differential.

5. The dehydrating breather apparatus of claim 4 wherein the vent valve has a core section mounted in the port at the bottom of the vessel, the core section having a central bore and holes extending through the core section to the bore to pass accumulated water in the vessel therethrough.

6. The dehydrating breather apparatus of claim 1 wherein the container includes a cylindrical mesh screen and a circular bottom panel engaged to the cylindrical mesh screen, the cylindrical mesh screen readily passing air therethrough to contact with particulate desiccant contained within the container.

7. The dehydrating breather apparatus of claim 1 wherein the heater includes a finned heat exchanger having multiple fins defining channels between them within which the desiccant is held with large surface area contact between the desiccant and the fins of the heat exchanger, and at least one electrical heating element engaged with the finned heat exchanger which heats the finned heat exchanger when the heating element is supplied with electrical power.

8. The dehydrating breather apparatus of claim 7 wherein the finned heat exchanger is formed of blocks of extruded aluminum each having a base section with integral fins extending therefrom.

9. The dehydrating breather apparatus of claim 7 wherein the finned heat exchanger has a central channel which is in communication with the orifice in the cap and including a plurality of holes in the finned heat exchanger extending from the channels between the fins to the central channel to allow air to pass into and out of the central channel.

10. The dehydrating breather apparatus of claim 9 wherein the cap further includes at least one passageway that extends from the exterior of the cap to the finned heat exchanger and wherein electrical feed wires extend through the passageway to the electrical heating element within the finned heat exchanger.

11. The dehydrating breather apparatus of claim 7 wherein the electrical heating element is a positive temperature coefficient resistive heating element that stabilizes at a predetermined temperature when supplied with electrical power.

12. The dehydrating breather apparatus of claim 7 including a timer electrically connected to supply power to the electrical heating element, the timer providing electrical power to the heating element for a selected period of time at selected intervals.

13. The dehydrating breather apparatus of claim 1 wherein the vessel is formed of transparent plastic.

14. The dehydrating breather apparatus of claim 13 wherein the plastic is polycarbonate.

15. The dehydrating breather apparatus of claim 1 further including at least one closable opening in the cap through which particulate desiccant may be introduced through the cap into the desiccant container.

16. The dehydrating breather apparatus of claim 1 wherein said interior wall generally converges toward said discharge port.

17. The dehydrating breather apparatus of claim 16 wherein said screen is cylindrical.

18. The dehydrating breather apparatus of claim 17 wherein said vessel is an elongated bowl.

* * * * *